United States Patent [19]

Liedloff

[11] Patent Number: 5,331,061

[45] Date of Patent: Jul. 19, 1994

[54] THERMOPLASTICALLY PROCESSABLE ELASTOMERIC BLOCK COPOLYETHERESTERETHERAMIDES AND PROCESSES FOR THE PRODUCTION AND USE THEREOF

[75] Inventor: Hanns-Jorg Liedloff, Domat/Ems, Switzerland

[73] Assignee: EMS-Inventa AG, Switzerland

[21] Appl. No.: 988,346

[22] Filed: Dec. 9, 1992

Related U.S. Application Data

[63] Continuation of Ser. No. 526,842, May 22, 1990, abandoned.

[30] Foreign Application Priority Data

May 24, 1989 [DE] Fed. Rep. of Germany ....... 3917017

[51] Int. Cl.$^5$ .................. C08L 67/00; C08L 77/00
[52] U.S. Cl. .................. 525/425; 525/408; 525/420.5; 525/434; 528/288; 528/295.3; 528/324; 528/325
[58] Field of Search .............. 525/420.5, 434, 425, 525/408

[56] References Cited

U.S. PATENT DOCUMENTS

| | | | |
|---|---|---|---|
| 4,346,024 | 8/1982 | Coquard et al. | 524/219 |
| 4,361,680 | 11/1982 | Borg et al. | 525/420 |
| 4,740,582 | 4/1988 | Coquard et al. | 528/339.3 |

*Primary Examiner*—Ana L. Carrillo
*Attorney, Agent, or Firm*—Jordan B. Bierman

[57] ABSTRACT

Thermoplastically processable elastomeric block copolyetheresteretheramides from recurring units of the formula

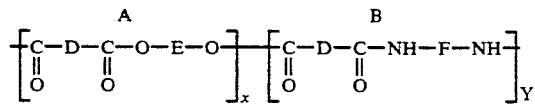

in which

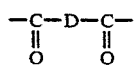

represents a polyamide segment containing terminal carboxyl groups and having an average molar mass of 700 to 10 000, —O—E—O— is a poly-(oxytetramethylene)-segment having an average molar mass of 600 to 3 500, —NH—F—NH— represents a poly-(oxy-1,2-propylene)-segment containing terminal amino groups and having an average molar mass of 350 to 2 500, x and y are integers from 3 to 35 and indicate the number of the respective, randomly arranged, recurring units, the ratio x:y of components A and B varying between 5:1 and 1:5.

The ether amides of the present invention can optionally be mixed with additives, fillers, modifiers, or other compatible polymers normally used in the processing of polyamides and which are suitable for the production of molded articles, for example by injection molding, coinjection, extrusion, blow molding, etc.

10 Claims, No Drawings

THERMOPLASTICALLY PROCESSABLE ELASTOMERIC BLOCK COPOLYETHERESTERETHERAMIDES AND PROCESSES FOR THE PRODUCTION AND USE THEREOF

This application is a continuation of application Ser. No. 07/526,842 filed May 22, 1990, now abandoned.

The invention relates to thermoplastically processable elastomeric block copolyetheresteretheramides, a process for producing them and their use for the production of shaped articles. Production takes place, in particular, by extrusion, injection molding, coinjection molding, injection welding, or blow molding.

BACKGROUND OF THE INVENTION

The block etheramides of the invention, such as the polyetherpolyamides described in DE-PS 30 06 961 or the polyetheresteramide block copolymers (polyetheresteramides) described in DE-PS 25 23 991, belong to the category of polyamide elastomers (PA-elastomers). The term "block copolyetheresteretheramide" emphasizes that the polyether contents of the products according to the invention are linked to the polyamide segments by ester or amide bonds. For the sake of simplicity, the term "PA-elastomers" will be used herein.

The most important PA-elastomers found in the market nowadays undoubtedly include those whose polyamide segments —CO—D—CO— had resulted from the polymerization or the polycondensation of caprolactam, laurolactam, or the corresponding ω-amino-α-carboxylic acids in the presence of a dicarboxylic acid.

According to DE-PS 25 23 991, PA-segments having terminal carboxyl groups are esterified with α,ω-dihydroxypolyethers and the polyetheresteramides are thus obtained. According to DE-PS 30 06 961, PA-segments are reacted with α,ω-diamino polyethers to form polyetheramides. Both methods of synthesis of PA-elastomers are subject to a number of restrictions; hence, a highly flexible PA-6-elastomer having a flexural modolus of elasticity of less than about 200 N/mm² (measured in the dry state) and acceptable properties for processing and use cannot be produced by the batch processes according to the teachings of either of these references.

DE-PS 25 23 991 describes various linear or branched aliphatic polyoxyalkylene glycols as components which have a flexibilizing effect, in particular the following:

| I: | Polyoxyethylene glycol = | α,ω-dihydroxypoly-(oxyethylene). |
|---|---|---|
| II: | Polyoxypropylene glycol = | α,ω-dihydroxypoly-(oxy-1,2-propylene), |
| III: | Polyoxytetramethylene glycol | α,ω-dihydroxypoly-(oxytetramethylene), |
| IV: | Copolyethylene glycol-propylene glycol | |

Although highly flexible products can be produced with component I, they have the distinct disadvantage that they absorb considerable quantities of water when in contact with moisture. Thus, with 50% by weight of segments of I, the water absorption corresponds approximately to the weight of the respective block polymer.

Polyoxypropylene glycol (II) can, if its average molar mass exceeds the value of 1000 required for highly flexible, readily processable PA-6-elastomers, be mixed only to a limited extent with the respective short-chain, carboxyl-terminated PA-6-segments (Mn ≧ 1300), so a high molecular weight polymer cannot be built up. A further distinct disadvantage, at least for batchwise production processes, is that polyoxypropylene glycol is very sensitive to elevated temperatures and tends to discolor and decompose under the normal polycondensation conditions. In addition, it can only be esterified with difficulty due to its individual secondary alcohol function.

Polyoxytetramethylene glycol (III) is poorly miscible with PA-6-segments, which limits the potential polymers to less flexible products. The drawbacks mentioned with regard to I and II also apply to IV.

According to the teaching of DE-OS 30 06 961, PA-6-elastomers can be produced by condensation of PA-6 containing terminal carboxyl groups with V: α,ω-diamino-poly-(oxy-1,2-propylene) or
VI: α,ω-bis-3-aminopropyl-poly-(oxytetramethylene), wherein an industrial, hydrogenated or non-hydrogenated, dimerized fatty acid or "dimeric acid" containing 36 carbon atoms (which can contain a small quantity of trimerised fatty acid containing 54 carbon atoms) is preferably used as a chain length regulator.

It is just as impossible to produce a highly flexible PA-6-elastomer using the flexibilizing component V as with component II which is comparable therewith. This is due to the limited miscibility of PA-6-segments (Mn ≧ 1300) with the respective poly-(oxy-1,2-propylene)-segments. However, the thermal stability of diamine V is significantly higher than that of diol II. Its reactivity toward carboxyl groups is greater than that of diol II.

The use of component VI for producing a highly flexible PA-6-elastomer is hindered by its poor miscibility with the PA-segments. In addition, diaminopolyether VI is so expensive (due to its complicated synthesis) that it cannot be considered for the commercial production of a highly flexible PA-6- or PA-12-elastomer.

According to the teaching of DE-PS 30 06 961, a satisfactory result cannot be achieved either with the polyether component V containing terminal amino groups or with VI for the synthesis of a highly flexible PA-12-elastomer. Polyetherdiamine VI fails for the above-mentioned reason and with diamine V, having contents of more than about 30% by weight in the PA-12-elastomer, only products which have yellow to brown discoloration and are sometimes markedly decomposed can be produced.

If a PA-12 containing terminal carboxyl groups is polycondensed with the above-mentioned components I to IV according to DE-PS 25 23 991, then the disadvantages already mentioned with regard to I, II or IV also apply. With III as flexibilizing component, PA-12-elastomers of almost any flexibility having very good properties for processing and use can generally be produced. However, these PA-12-elastomers still have the following distinct disadvantages.

The first disadvantage resides in the inadequate compatibility of PA-12-segments having an average molar mass higher than about 1000 and segments of the flexibilizing component III having an average molar mass higher than about 1100 in highly flexible elastomers having a content of III amounting to more than about 45% by weight. The lack of compatibility is revealed by the cloudy milky appearance of the PA-12-elastomers in the solidified (crystallized out) state; the strength of parts produced therefrom is diminished transversely to the processing direction owing to the delaminability of the layered structures. The increased susceptibility to mechanical wear, for example, the abrasion of such PA-12-elastomer products, is closely related. The above-mentioned disadvantages cannot be eliminated by modifying the production process.

The second disadvantage of these PA-12-elastomers is that they are not unreservedly suitable for coinjection molding or injection welding. The latter process is a special injection molding process in which polymer A is injected in a conventional injection mold onto a solidified part of the same-or usually a different-polymer inserted therein. Finished articles of which the functions can be optimally adapted to the specific requirements by suitable polymer combinations are obtained in this way. For example, it is possible by this process to restrict the elasticity in a given finished article to the regions where it is actually advantageous and to keep the remainder of the article rigid. The process also affords considerable advantages in the coloring of injection moldings.

The fundamental condition for the application of injection welding to a specific pair of polymers is good adhesive strength at the contact faces between the polymers. High strength interlayer adhesion is achieved because the injection molded polymer melts a thin layer of the inserted plastic part and the melts of the two materials are mixed together. The miscibility of the polymers must be ensured; obviously, the process fails if the polymers are incompatible.

With regard to PA-12-elastomers with co-component III according to DE-PS-25 23 991, they are preferably combined with other elastomers of this type or with unmodified PA-12. The adhesive strength achieved in these cases is generally good, but it does not meet all requirements, particularly if the molecular weight of the PA-12-elastomer is comparatively low.

The production of good adhesive strength is difficult at relative viscosities (as a measure of the molecular weight of the PA-12-elastomers) of less than 2.1 (measured as 0.5% solution in m-cresol at 25° C. according to DIN 53727).

DESCRIPTION OF THE INVENTION

The object of the present invention is to provide new polyamide elastomers without the above-mentioned numerous disadvantages in preparation and use.

The block copolyetheresteretheramides according to the invention cover a very wide flexibility range. Expressed in terms of the flexural modulus of elasticity—measured according to DIN 53452 on dry test pieces—this range lies between about 40 and 700 N/mm$^2$. The products according to the invention are suitable for the production of injection molded, extruded, blow molded, coinjection or injection welded parts. Other processing methods can equally well be adopted for these products.

The invention also relates to a process for producing the block copolyetheresteretheramides according to the invention which resides in the fact that carboxyl-terminated polyamides (component —CO—D—CO—) are polycondensed with equimolar quantities of $\alpha,\omega$-dihydroxypolyoxytetramethylene (component —O—E—O—) or $\alpha,\omega$-diaminopolyoxy-1,2-propylene (component —NH—F—NH—). In other words, the CO—D—CO group is reacted with either the O—E—O group or the NH—F—NH group. The two resulting materials are then copolymerized to form the final product.

The carboxyl-terminated polyamides are preferably obtained from lactams containing 6 to 12 carbon atoms, or from linear $\omega$-amino-$\alpha$-carboxylic acids containing 6 to 12—especially 11 and 12—carbon atoms and dicarboxylic acids containing 6 to 36 carbon atoms for forming terminal carboxyl groups. It is preferably to use caprolactam and laurolactam and, as the $\omega$-aminocarboxylic acid, $\omega$-aminoundecanoic acid, $\omega$-aminolauric acid, adipic acid, azelaic acid, sebacic acid, dodecanedioic acid, and dimerized fatty acid.

Processes for producing carboxyl-terminated polyamides are known. Various processes for linking these polyamides to $\alpha,\omega$-dihydroxypoly-(oxytetramethylene) to the corresponding etheresteramide partial structure are also known. The process is usually carried out under reduced pressure at temperatures of between 200° and 280° C. in the presence of effective esterification/-transesterification catalysts. Tin(II)-compounds, for example Tin(II)-oxide, Tin(II)-salts of mono- or dicarboxylic acids, as well as zirconium compounds, for example Zr-tetraisopropylate are suitable, among others, as catalysts.

The etheramide partial structure is also formed in the above-mentioned temperature range. The partial structures can be built up in succession or simulataneously. The synthesis of one of the two or both partial structures can also take place simultaneously with the build-up of the polyamide segments —CO—D—CO. This shows that numerous variations of the process are possible. The examples demonstrate this more fully.

As already mentioned, the block copolyetheresteretheramides according to the invention can be modified with other polymers and can exist as a mixture with copolyolefins bearing one or more carboxyl, carboxylate, and carboxylic acid anhydride groups and other polar molecular radicals. They can very easily be mixed, for example, with grafting products of ethylene/propylene or ethylene/propylene/diene copolymers and maleic acid anhydride. In this, they are comparable to the PA-elastomers of the prior art, as described in CH-PS 655 941. The melt index, flexibility, notched impact strength, and processibility of PA-elastomers, among other things, can be positively influenced by the addition of, for example, polar copolyolefins.

The addition of reinforcing agents or fillers, such as glass fibers or minerals, is also possible. The PA-elastomers according to the invention can obviously contain the usual additives such as anti-oxidants, UV-stabilizers, antistatic agents, conductive carbon black, flame-retardant additives, etc.

The following examples illustrate but do not limit the invention.

The relative viscosities of the products have been measured in accordance with DIN 53727 using 0.5% solutions in m-cresol at 25° C. Mechanical properties were measured on dry test bars; the flexural modulus of elasticity according to DIN 53452, the notched impact strength according to DIN 53453, and the tensile strength and elongation at break according to DIN 53455. The melting temperatures (maxima) were measured using a DSC device, model 990 produced by DuPont. All other tests are described in the individual examples.

COMPARATIVE EXAMPLE 1 according to DE-OS 30 06 961

Various block copolyetheramides with polyamide-6-segments are produced. The chain length regulator of the PA-6-segments is non-hydrogenated dimeric acid having a molar mass of 570 g/mole (Pripol 1013 produced by Unichem), the flexibilizing component is an α,ω-diaminopoly(oxy-1,2-propylene) having an average molar mass of 1980 g/mole (Jeffamin D 2000 produced by Texaco). 0.3% (24 g) of antioxidant (Irganox 1330 produced by Ciba-Geigy) is added to the individual reaction mixtures in each case.

The block copolyetheramides are produced by pouring all components, together with 0.5 liter of water, into a steel autoclave with stirrer, temperature indicator, and the other necessary devices. The autoclave is thoroughly purged with pure nitrogen and then sealed. The reactants are heated to 260° C. with stirring, and the internal pressure is adjusted to about 18 bar. This pressure is maintained for two hours and is then reduced to atmospheric pressure in the course of one hour by slowly opening the autoclave. Polycondensation is subsequently carried out for eight hours with passage of dry nitrogen. At the end, the polymer is extruded through a die and the strand of melt is granulated after cooling in a water bath.

Only batch 1.1, a milky cloudy product having a relative viscosity of 1.61, could be granulated. The other batches could not be granulated owing to their low viscosities (molar masses) and were brittle in the solidified state. Further details are given in Table I.

Test bars were injection molded from batch 1.1 and their flexural modulus of elasticity was determined to be 410N/mm². Batches 2 to 5 could not be injection molded. These products demonstrate that highly flexible PA-6-elastomers cannot be obtained by this method.

COMPARISON EXAMPLE 2

The general formula of these products corresponds to that given in DE-PS 25 23 991. In particular, however, DE-PS 25 23 991 does not claim dimerized fatty acid, of the type used here, as co-component. Instead of a titanium compound as esterification catalyst according to DE-PS 25 23 991, a substantially more effective tin-(II)-compound according to DE-OS 34 28 404 is used in this case.

Test 2.1

28 kg of caprolactam, 8.28 kg of dimerized fatty acid and 150 g of Irganox 1330 (antioxidant) are poured into a 100 liter steel autoclave equipped with a stirrer, temperature indicator, and vacuum pump, are heated to 225° C. under nitrogen with continuous stirring; and are kept at this temperature for two hours. 9.04 kg of α,ω-dihydroxypoly(oxytetramethylene) having an molar mass of 1000 g/mole (Terathane 1000 produced by DuPont) and 10.25 kg of an equivalent dihydroxypolyether having an molar mass of 2000 g/mole (Terathane 2000 produced by DuPont) are then introduced together with 100 g of the tin-(II)-salt of 2-ethylhexanoic acid produced by Acima/Buchs, Switzerland.

The autoclave is closed immediately afterwards and nitrogen is introduced to a gauge pressure of about 1 bar. In the closed autoclave, the components are stirred for one hour at 250° to 255° C. The pressure is then released and a vacuum is applied immediately after normal pressure has been achieved. An internal pressure of 1/mbar is reached within about one hour. Polycondensation is carried out for 6 hours at this pressure and at a product temperature of 250° C.

The block copolyetheresteramide obtained is then quenched and granulated. The melt of the product is milky/cloudy, and opaque and yellowish in the solidified state. The relative viscosity is 1.54, the maximum melting point is 212° C., and 3.95 kg (14.1% based on caprolactam used) of the caprolactam is distilled off during polycondensation.

Despite its very high flexibility (flexural modulus of elasticity: 145 N/mm²), this product was completely useless; injection molded test bars had a pronounced layered structure, the layers of which could easily be separated from one another mechanically. Extruded strands of the product cut longitudinally at one end could easily tear in the processing direction. The fibrillar structure of the polymers could be detected at the dull crack faces. The polymer consequently had very poor strength transverse to the processing direction. The other characteristic values of the polymers are as follows:

Molar mass of the PA-segments: 2132 g/mole (allowing for the caprolactam distilled off during production thereof as well as 1.1% by weight of caprolactam which

TABLE I

| | | | | | Characterisation of the block copolyetheramides | | | |
|---|---|---|---|---|---|---|---|---|
| Test | Cl a) | DS b) | P c) | Rel. visc. | PA-Segment Mn d) | Polyether % by wt. e) | Strength | Appearance |
| 1.1 | 5.6 | 0.535 | 1.865 | 1.61 | 5910 | 23.4 | delaminated f) | cloudy, like mother-of-pearl |
| 1.2 | 4.8 | 0.714 | 2.486 | 1.39 | 4040 | 31.3 | brittle | yellowish, opaque |
| 1.3 | 4.4 | 0.803 | 2.797 | 1.36 | 3395 | 35.2 | brittle | yellowish, opaque |
| 1.4 | 3.6 | 0.98 | 3.42 | 1.31 | 2315 | 43.2 | brittle | yellowish, opaque | a) Caprolactam.
b) dimeric acid.
c) Jeffamin D 2000
d) Calculated from the quantity of dimeric acid and the reacted caprolactam. Unreacted caprolactam was separated by 12-hour extraction of the products with water at 95° C. The conversion of the caprolactam was uniformly about 90%.
e) Calculated from the formulations.
f) Delamination in processing direction on test pieces and extruded strands.

had been extracted from the polymer with water at 85° C. within 8 hours):

Molar mass of the two polyethers (Terathane): 1365 g/mole

Melting point (maximum): 212° C.

Test 2.2

In the same way as described in Test 2.1, a block copolyetheresteramide is produced from 28 kg of caprolactam, 8.28 kg of Pripol 1013, and 14.53 kg of Terathane 1000. The relative viscosity of the product thus obtained is 1.65, the molar mass of its PA-segments is 2160 g/mole (corresponding to a loss of 3.9 kg of caprolactam during polycondensation and 0.9% by weight of caprolactam in the polymer; see Test 2.1).

Melting point (maximum): 213° C.

The measurement of the flexural modulus of elasticity on injection molded test bars yielded a value of 255 N/mm². The test bars exhibited layers which could easily be removed mechanically but not in such a pronounced fashion as in product 2.1.

Comparison Example 2 shows that useful, highly flexible PA-6-elastomers cannot be obtained by this method.

EXAMPLE 3

Test 3.1: (to be compared with Comparison Example 1 and Test 2.1)

A block copolyetheresteretheramide is produced from 28 kg of caprolactam, 8.28 kg of Pripol 1013, 6.25 kg of Jeffamin D 2000, 9.04 kg of Terathane 1000, and 4 kg of Terathane 2000 using 100 g of Tin(II)-dioctoate (catalyst) and 150 g of Irganox 1330 (antioxidant). As in Comparison Example 2, caprolactam, Pripol 1013, Jeffamin D 2000, and Irganox 1330 are poured into steel autoclaves and heated to 255° C. with stirring and the passage of nitrogen. The reactants are kept at this temperature for 2 hours. The partial structure in which the PA-6-segment is linked to the α,ω-diamino-poly(oxy-1,2-propylene) is formed in the course of the reaction. The two types of Terathane are subsequently added along with the catalyst. After addition thereof, the procedure adopted in Test 2.1 of Comparison Example 2 is followed. The product is of the formula

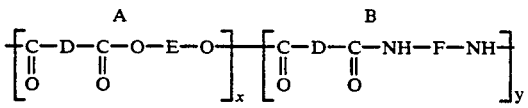

in which

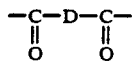

- represents a polyamide segment

The product had the following characteristic values:

| Relative viscosity: | 1.77 |
|---|---|
| Melting point (maximum): | 211.5° C. |
| Molar mass of the PA-segments: | 2150 g/mole |
| Ratio | x:y = 3.53:1 |

The product was substantially transparent as a granulate. It did not exhibit layered structures or delamination/fibrillation either in the form of extruded strands or injection molded test bars. Its flexural modulus of elasticity was 140 N/mm²; a value of 560 N/mm² was measured at −40° C. The elastomer did not exhibit a breakage to −40° C. in the test to measure the notched impact strength.

Test 3.2: (to be compared with Comparison Example 1 and Test 2.2)

A block copolyetheresteretheramide is produced from 28 kg of caprolactam, 8.28 kg of Pripol 1013, 6.25 kg of Jeffamin D 2000, and 11.04 kg of Terathane 1000 under the conditions given for Test 3.1; the catalyst and antioxidant are also the same as in Test 3.1.

The product had the following characteristic values:

| Relative viscosity: | 1.699 |
|---|---|
| Melting point (maximum): | 211.5° C. |
| Molar mass of the PA-segments: | 2160 g/mole |
| Ratio | x:y = 3.53:1 |

With the exception of its flexural modulus of elasticity, for which a value of 165 N/mm² was measured, this elastomer corresponded to the product of Test 3.1.

The viscosity or the molar mass of such PA-6-elastomers can be readily increased by subsequent condensation in the solid phase which is normal for conventional polyamides. For this purpose, each product is treated in finely divided form - for example as a granulate - at a temperature slightly below its melting point under vacuum or under dry nitrogen.

The subsequent condensation conditions for this PA-6-elastomer were as follows:

| Temperature (heating medium): | 180° |
|---|---|
| Pressure: | 0.1 to 0.2 mbar |
| Duration: | 7 hours |
| Quantity of granulate used: | 250 g |

The subsequent condensation tests were carried out with four further batches. The results obtained can be inferred from the following Table.

| | Relative viscosity | |
|---|---|---|
| Batch | Before Subsequent condensation | After Subsequent condensation |
| 3.2/2 | 1.696 | 1.956 |
| 3.2/3 | 1.693 | 1.977 |
| 3.2/4 | 1.7 | 1.939 |
| 3.2/5 | 1.696 | 1.914 |

COMPARATIVE EXAMPLE 4

Product: according to DE-PS 25 23 991; production process: according to DE-OS 34 28 404 with a highly effective Tin(II-compound as the esterification catalyst.

88.5 g of ω-aminolauric acid, 16.92 g 1,12-dodecanedioic acid, 159.1 g of Terathane 2000, 0.5 g of Tin(II)-dibenzoate, and 0.75 g of Irganox 1330 are melted in a 1 liter multi-necked flask with metal stirrer, distillation receiver, temperature probe, nitrogen supply pipe, and vacuum connection, with passage of nitrogen, and are mixed with stirring. The contents of the flask are further heated; polycondensation commences at about 175° C. with the formation of water (predominantly from ω-aminolauric acid). After about 2 hours and after the product temperature has reached 260° C., the evolution of water comes to a virtual standstill. At this moment, the melt is milky/cloudy and virtually opaque. The water of reaction (about 7 ml) is removed from the distillate receiver. Vacuum is then applied and polycondensation is carried out for 75 minutes with stirring at 255° to 260° C. and pressure of 0.4 to 0.6 mbar.

During polycondensation, the viscosity of the melt increases considerably, but its milky/cloudy appearance does not change. On completion of the reaction, a portion of the melt is pressed in a suitable mold to a 3 mm thick slab and is caused to solidify by slow cooling. The slab is white and opaque. The remainder of the melt is poured onto a metal plate as a strand having a cross section of 10 to 40 mm$^2$ and is cooled. The strand obtained in this way does not differ in appearance from the pressed slab. Some test bars, 1 cm wide and about 8 cm long, are cut from the slab. The flexural modulus of elasticity of the elastomer is determined as about 55N/mm$^2$.

Despite its high flexibility, this PA-12 elastomer is useless for the production of extruded or injection molded parts owing to the defective transverse strength of the strands which, after applying a cut longitudinally to the direction of flow, could easily be torn over an average length of more than 5 cm (similarly to the products of Comparison Example 2). A pronounced fibrillar structure could be detected at the dull crack faces. The shearing force acting upon the melt during the pouring of the strands was sufficient to expose the melt to such pronounced extensional deformation that a fibrillar structure was produced.

With normal processing methods, such as injection molding or extrusion, very much higher forces of extension and shearing occur, with the result that the fibrillation of such a PA-12-elastomer appears to a much more undesirable extent therein.

The other characteristic values of the elastomer were as follows:

| Relative viscosity: | 1.836 |
|---|---|
| Melting point (maximum): | 165.5° C. |
| Average molar mass of the PA-segments: | 1317 g/mole |

EXAMPLE 4 to be compared with Comparison Example 4

A block copolyetheresteretheramide is produced under the same reaction conditions as in Comparison Example 4 from 88.5 g of α-aminolauric acid, 16.92 g of 1,12-dodecanedioic acid, 103.67 g of Terathane 2000, and 55.32 g of Jeffamin D 2000. 0.5 g of Tin(II)-dibenzoate is used as the catalyst and 0.75 g of Irganox 1330 as the antioxidant.

On completion of polycondensation, which takes 60 minutes and is therefore shorter than in Comparison Example 4, the clear, firmly transparent melt of the elastomer is processed in the manner described hereinbefore into a 3 mm thick slab and into strands.

The flexural modulus of elasticity of the product was 53N/mm$^2$. However, the strands had a much higher transverse strength than the elastomers from Comparison Example 4. They did not exhibit a fibrillar structure which would have enabled a crack longer than about 1 cm parallel to the direction of flow to be formed. Instead, the cracks swerved to the side. In contrast to Comparison Example 4, the crack faces were not dull but glossy.

Other characteristic values of the elastomer:

| Relative viscosity: | 1.726 |
|---|---|
| Melting point (maximum): | 165.5° C. |
| Molar mass of the PA-segments: | 1317 g/mole |
| Ratio | x:y = 1.87:1 |

COMPARISON EXAMPLE 5

The interlayer adhesion during the injection welding of two block copolyetheresteretheramides according to DE-PS 25 23 991, both produced by the process according to DE-OS 34 28 404, are tested.

The more rigid product (5-1) is obtained from 36.7 kg of laurolactam, 1.27 kg of 1,12-dodecanedioic acid, and 5.5 kg of Terathane 1000. The quantity of catalyst used Tin(II)-dioctoate) is 90 g, and 100 g of Irganox 1330 serves as the antioxidant. The lactam and the dicarboxylic acid are initially melted in a 100 liter autoclave under nitrogen and the mixture obtained is homogenized by stirring. The two components are then reacted within four hours at 285° C. to 290° C. to form the corresponding carboxyl-terminated polyamide.

After the melt cools to 260° C., the other above-mentioned components are added and mixed with the polyamide. Polycondensation takes place with stirring at a pressure of 0.5 to 1 mbar. Polycondensation is completed about 40 minutes after the beginning of the vacuum phase.

The relative viscosity of the elastomer was 1.93. At a rate of 200 mm/min, its tensile strength was 33N/mm$^2$ and its elongation at break was 255%.

The more flexible product (5-2) is obtained in a similar manner from 30 kg of laurolactam, 2.57 kg of 1,12-dodecanedioic acid, and 12 kg of Terathane.

| Catalyst: | 90 g of Tin(II)-dioctoate |
|---|---|
| Antioxidant: | 135 g of Irganox 1330 |

After 60 minutes of polycondensation, the product was formed with a relative viscosity of 1.963. Its tensile strength was 35N/mm$^2$ and its elongation at break was 285 to 290%.

Half tensile test specimens (10 mm wide and 4 mm thick) are initially produced from the material of Test 5-1 to measure the adhesion strength between the two elastomers. For this purpose, half of the injection mold is filled with a suitably adapted piece of metal.

The polymer 5-1 is injection molded under the following conditions:

| Mass Temperature: | 237° C. |
|---|---|
| Pressure: | 733 bar |
| Metering time: | 10.8 sec |
| Injection time: | 0.9 sec |
| Cycle time: | 38 sec |

The tensile test specimens of 5-1 are then inserted into the mold instead of the piece of metal. The elastomer 5-2 is then injected onto them under the following conditions:

| | |
|---|---|
| Mass Temperature: | 234° C. |
| Pressure: | 733 bar |
| Metering time: | 10.4 sec |
| Injection time: | 1.35 sec |
| Cycle time: | 43.6 sec |

A tensile test is carried out on the parts composed of Tests 5-1 and 5-2, under the same conditions. A tensile strength of 16.4 N/mm² is found with an elongation at break of 35%.

EXAMPLE 5

As described in Comparison Example 5, the interlayer adhesion between elastomer 5-1 and the following block copolyetheresteretheramide 5-3 is tested. The PA-12-elastomer 5-3 produced from 30 kg of laurolactam, 3.65 kg of dodecanedioic acid, 10.15 kg of Terathane 1000, and 2.25 kg of α, ω-diamino-poly(oxy-1,2-propylene) having an molar mass of 425 g/mole (Jeffamin D 400 produced by the company Texaco), by a process similar to that employed in Test 5-2.

| | |
|---|---|
| Catalyst: | 90 g of Tin(II)-dioctoate |
| Antioxidant: | 135 g of Irganox 1330 |

The elastomer was formed with a relative viscosity of 1.957.

*Ratio x:y=1.93:1.*

With a flexural modulus of elasticity of 280 N/mm², its flexibility corresponded to that of the elastomer 5-1 (275 N/mm²). The tensile strength of 5-3 was 37 N/mm² with an elongation at break of 258%.

To produce an adhesive assembly with 5-1, 5-3 is processed under the following conditions:

| | |
|---|---|
| Mass Temperature: | 236° C. |
| Pressure: | 733 bar |
| Metering time: | 8.7 sec |
| Injection time: | 1.31 sec |
| Cycle time: | 38.4 sec |

Tensile testing of the elastomer assembly 5-1/5-3 yields a tensile strength of 16.7 N/mm² and an elongation at break of 157%. Energy at break is between 300 and 400% above the values of the combination of materials 5-1/5-2 (Comparison Example 5) as is determined from the respective stress/strain graphs by integration.

EXAMPLE 6

80 parts by weight of the product of Test 3.2 and 20 parts by weight of a highly flexible ethylene/propylene copolymer (ethylene content=84 mol %, melting point: about 48° C.) grafted with 0.5 parts by weight of maleic acid anhydride are fed into a twin screw extruder (WPF ZSK-30 produced by Werner and Pfleiderer, Stuttgart), and subsequently compounded at 150 RPM and a melt temperature of about 250° C. The polymer mixture thus obtained is processed into test bars and the following mechanical properties were determined.

| | |
|---|---|
| Flexural modulus of elasticity: | 100 N/mm² |
| Notched bar strength at −40° C.: | no breakage |

This Example shows that the flexibility can be increased by adding polyolefin elastomers of the type used here to the polyamide elastomers according to the invention.

I claim:

1. A thermoplastically processable, elastomeric, block copolyetheresteretheramide compound which consists of randomly arranged, recurring polyetheresteramide units A and polyetheramide units B in a ratio of units A to units B of 5:1 to 1:5, said units A and said units B being connected through ester and/or amide linkages, said units A being of Formula I

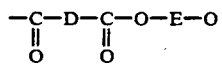

there being 3 to 35 of said Formula I in each of said units A;
said units B being of Formula II

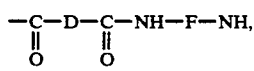

there being 3 to 35 of said Formula II in each of said units B;
and wherein
  D represents a divalent radical which remains after the removal of the carboxylic groups from a polyamide with terminal carboxylic groups having a molar mass of 700 to 10000 g/mol, and
  E is a divalent radical which remains after the removal of the hydroxyl groups from poly(oxytetramethylene) with terminal hydroxyl groups having a molar mass of 600 to 3500 g/mol, and
  F is a divalent radical which remains after the removal of the amino groups from poly-(oxy-1,2-propylene) with terminal amino groups having a molar mass of 350 to 2500 g/mol,
said compounds having a modulus of flexural elasticity of about 40 to about 700 N/mm².

2. The compound of claim 1 wherein said polyamide with terminal carboxylic groups comprises a reaction product of dicarboxylic acids with a monomer selected from the group consisting of lactams, ω-amino-ω-carboxylic acids, and mixtures thereof.

3. The compound of claim 2 wherein said lactams have 6 to 12 carbon atoms.

4. The compound of claim 2 wherein said ω-amino-α-carboxylic acids have 6 to 12 carbon atoms.

5. The compound of claim 2 wherein said lactams and said ω-amino-α-carboxylic acids have 11 or 12 carbon atoms.

6. The compound of claim 2 wherein said dicarboxylic acids have 6 to 36 carbon atoms.

7. The compound of claim 2 wherein said lactams are caprolactam, lauryl lactam, or mixtures thereof.

8. The compound of claim 1 wherein said polyamide segment is derived from ω-aminocarboxylic acid, adipic acid, azelaic acid, sebacic acid, dodecanedioic acid, dimerized fatty acid, or mixtures thereof.

9. The compound of claim 8 wherein said ω-aminocarboxylic acid is selected from the group consisting of ω-aminoundecanoic acid, ω-aminolauric acid, and mixtures thereof.

10. The process for the production of the compound of claim 1 comprising polycondensation of carboxylic terminated polyamides with an equimolar quantity of α-ω-dihydroxy-poly(oxytetramethylene) and α-ω-diaminopolyoxy-1,2-propylene.

* * * * *